US 8,666,356 B1

United States Patent
Prock et al.

(10) Patent No.: US 8,666,356 B1
(45) Date of Patent: Mar. 4, 2014

(54) PROVIDING CONCURRENT VOICE AND DATA CAPABILITIES USING A SINGLE COMMUNICATION PATH

(75) Inventors: John William Prock, Raymore, MO (US); Siddharth S. Oroskar, Overland Park, KS (US); Kurt M. Landuyt, Parkville, MO (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 236 days.

(21) Appl. No.: 13/243,195

(22) Filed: Sep. 23, 2011

(51) Int. Cl.
*H04M 11/00* (2006.01)

(52) U.S. Cl.
USPC .......................................................... 455/403

(58) Field of Classification Search
USPC ................................................ 455/403–457
See application file for complete search history.

(56) References Cited

U.S. PATENT DOCUMENTS 6,977,945 B1 * 12/2005 Noda et al. .................... 370/468

OTHER PUBLICATIONS

Cisco—understanding delay in packet voice networks, p. 1-18, 2007-2008.*

* cited by examiner

*Primary Examiner* — Fan Ng

(57) ABSTRACT

Systems, methods, and computer-readable media, for facilitating voice and data transmission over a single communication path during an aggregate communication event are provided. In some embodiments, the method includes aggregating voice data until a full voice frame can be transmitted or a maximum delay of voice transmission exists. A voice frame comprising the aggregated voice data is transmitted upon attaining the full voice frame or the maximum delay in voice transmission.

14 Claims, 5 Drawing Sheets

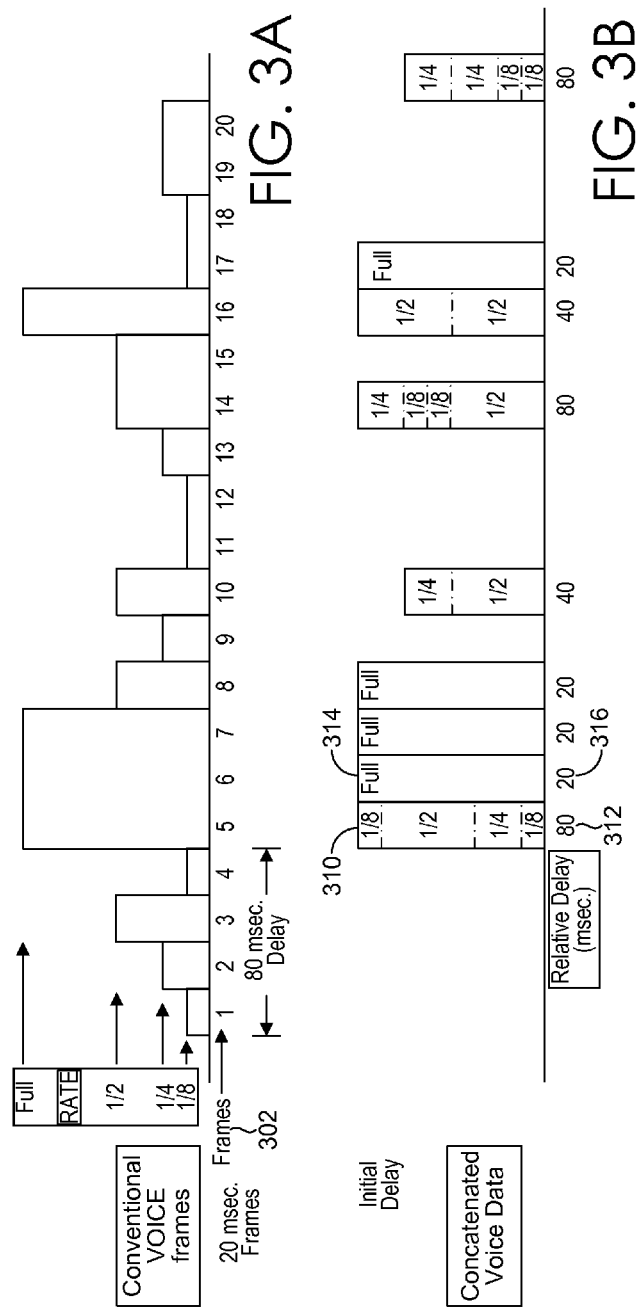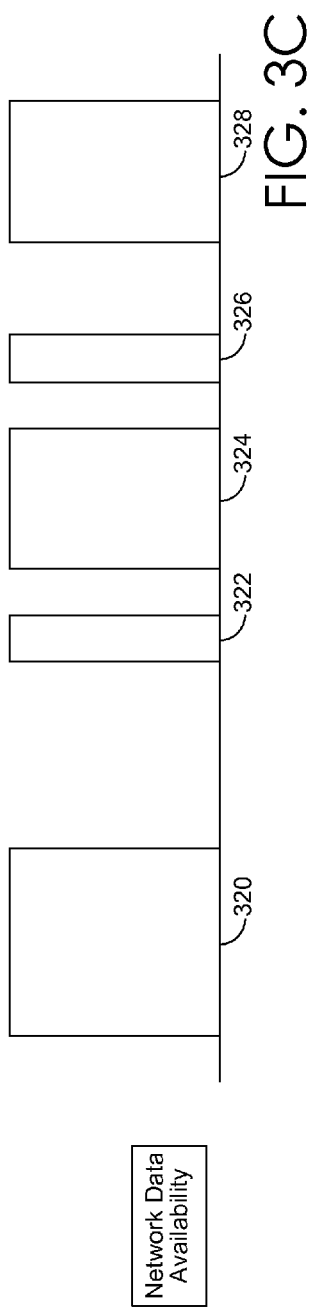

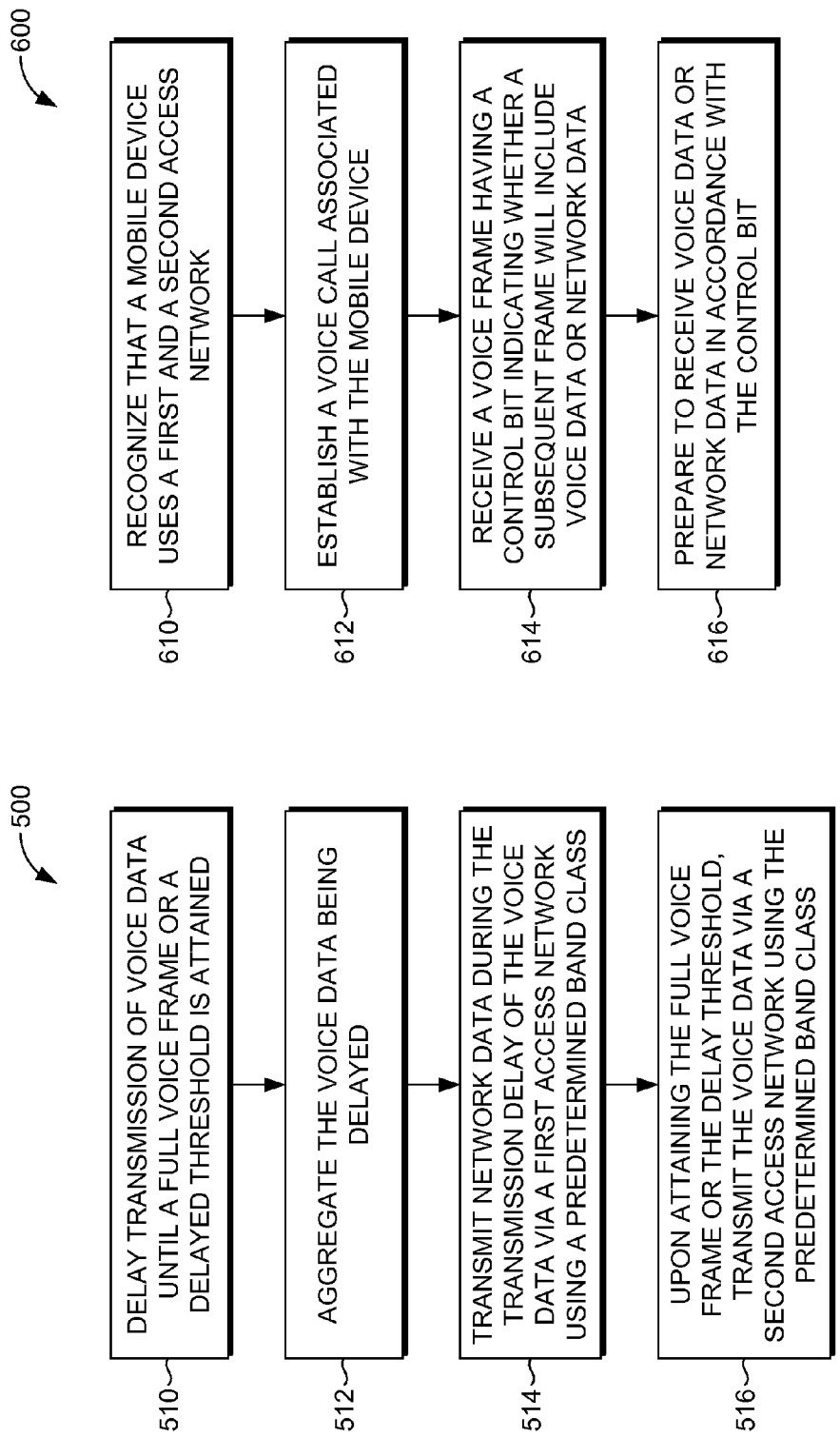

PROVIDING CONCURRENT VOICE AND DATA CAPABILITIES USING A SINGLE COMMUNICATION PATH

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, facilitating providing concurrent voice and data usage via a single communication path (e.g., a band class). Utilizing embodiments hereof, voice data are concatenated to enable concurrent voice and data transmission during an aggregate communication event. In this way, a user device can participate in a voice call and simultaneously perform data transmission using different access networks over a single communication path.

BRIEF DESCRIPTION OF THE DRAWINGS

Illustrative embodiments of the present invention are described in detail below with reference to the attached drawing figures, and wherein:

FIGS. 3A-3C illustrate voice data and network data during an aggregate communication event, in accordance with an embodiment of the present invention;

FIG. 5 provides an exemplary second method for facilitating providing voice and data using a single communication path during an aggregate communication event, in accordance with an embodiment of the present invention; and FIG. 6 provides an exemplary third method for facilitating providing voice and data using a single communication path during an aggregate communication event, in accordance with an embodiment of the present invention.

DETAILED DESCRIPTION

Figure 1:
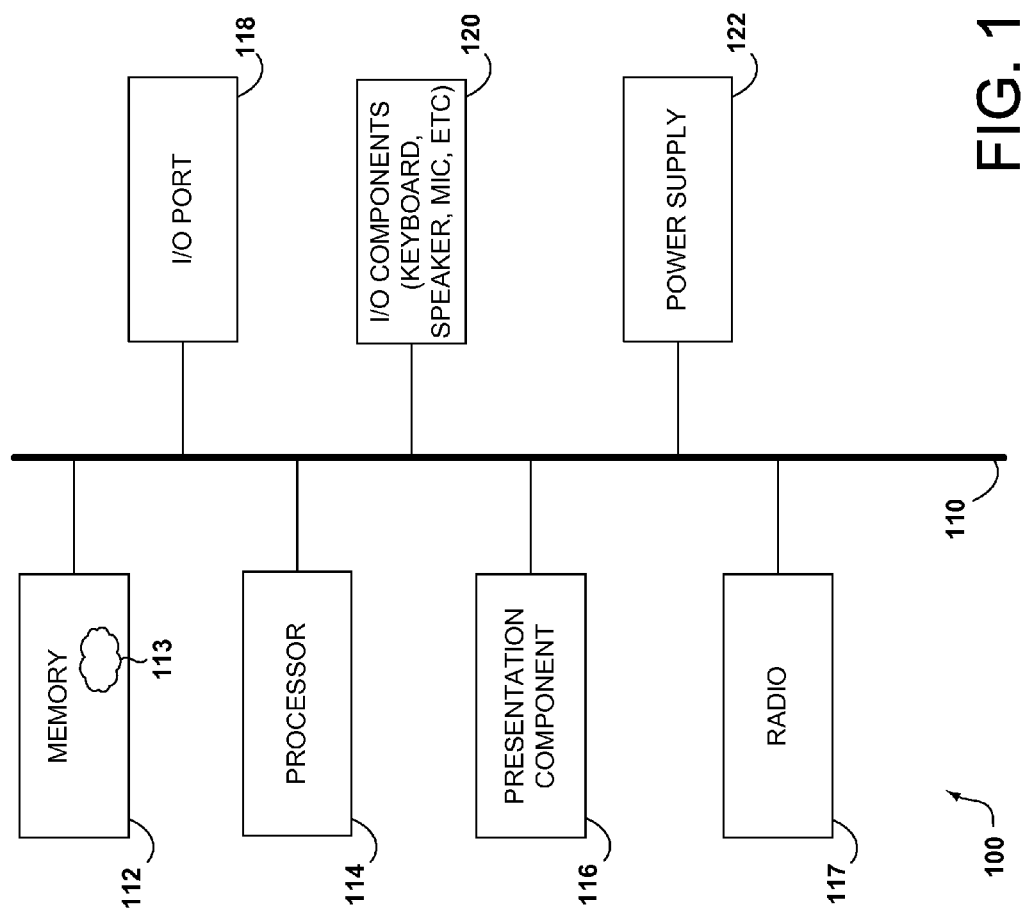
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for enabling voice and data transmission over a single communication path during an aggregate communication event. Utilizing embodiments hereof, voice data is aggregated or concatenated until a full frame can be established and transmitted or until a delay threshold is attained. In this regard, network data can be transmitted using the single communication path while transmission of the voice data is delayed. Accordingly, both voice data and network data can be transmitted from a mobile device via two separate access networks (e.g., CDMA and LTE) over a single communication path during an aggregate communication event.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Technology
    4G Fourth-Generation Cellular Communication System
    BSC Base Station Controller
    BTS Base Transceiver Station
    CD-ROM Compact Disk Read Only Memory
    CDMA Code Division Multiple Access
    GIS Geographic/Geographical/Geospatial Information System
    GPRS General Packet Radio Service
    GSM Global System for Mobile communications: originally from Groupe Spécial Mobile
    iDEN Integrated Digital Enhanced Network
    DVD Digital Versatile Discs
    EEPROM Electrically Erasable Programmable Read Only Memory
    LED Light Emitting Diode
    LTE Long Term Evolution
    PC Personal Computer
    PCS Personal Communications Service
    PDA Personal Digital Assistant
    RAM Random Access Memory
    ROM Read Only Memory
    TDMA Time Division Multiple Access
    UMTS Universal Mobile Telecommunications Systems Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support multiple technologies. For example, a radio of a communications device can operate to support CDMA as well as LTE, for example, to transmit voice and data.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention facilitate providing concurrent voice and data capabilities using a single communication path. In this regard, a user device using a first radio access network for data transmission and a second radio access network for voice transmission can transmit both voice and data during an aggregate communication event via a single communication path (i.e., band class). As discussed more fully below, voice data is concatenated to enable concurrent voice and data functionality during an aggregate communication event using a single communication path. Accordingly, a single band class can be used to transmit both voice and data during an aggregate communication event such that a user can have a phone conversation while navigating data. Utilizing a single band class to transmit both voice and data minimizes use of another band class thereby reducing network management and optimizing band class usage.

An aggregate communication event refers to a voice call occurring concurrently with a data event. A data event refers to any event associated with transmission of network data using an access network (e.g., LTE). Network data refers to data transmitted via an access network (e.g., LTE). A data event may be, for example, an audio data event, e.g., a ring tone download, an audio stream download; a video event, e.g., a clip or video stream download; a website navigation; or other data event, or any other data flow associated with an IP address, and the like. As such, network data can be data associated with such data events. In embodiments, network data refers to non-voice data. In some cases, network data might be data transmitted in association with the Internet. Network data may be referred to herein as data, network data, or network traffic.

Voice data refers to data associated with voice input of a voice call that is transmitted via an access network (e.g., CDMA). In some cases, voice data might be data transmitted in association with a wireless telecommunications network. Voice data may be referred to herein as voice, voice data, or voice traffic. In one embodiment, voice data is communicated using a first access network and network data is communicated using a second access network that is different from the first access network. In such an embodiment, both the voice data and the network data can be transmitted using a single communication path.

In one embodiment, an aggregate communication event may refer to the all of the data flow (e.g., voice data and network data) occurring during a voice session (i.e., phone call) between the user device and a recipient. In such a case, an aggregate communication event may end when the voice session between the user device and a recipient device ends. For example, assume a user device establishes a voice call with a recipient device such that a user and recipient can verbally communicate. Further assume that the user utilizes the user device to access, download, and navigate a web page. As such, the aggregate communication event may include the voice call and web page access including all data flow between the user device and the web page server until the voice call ends. The voice call may end upon the user or recipient ending the voice call or upon other termination of the voice call.

In embodiments, an aggregate communication event utilizes multiple radio access networks or technologies to communicate both data and voice. By way of example only, and not limitation, a first radio access network, such as CDMA, can be used by a user device to enable voice communication between the user device and a recipient device, while a second radio access network, such as LTE, can be used by the user device to enable data communication between the user device and another computing device (e.g., a web server). While separate technologies are utilized to transmit data and voice, embodiments of the present invention enable a single communication path (i.e., band class) to be used by both technologies during an aggregate communication event.

According, in one aspect, the present invention is directed to one or more computer-readable media having computer-executable instructions embodied thereon that, when executed, perform a method for facilitating voice and data transmission over a single communication path during an aggregate communication event. The method includes aggregating voice data until a full voice frame can be transmitted or a maximum delay of voice transmission exists. The method also includes transmitting a voice frame comprising the aggregated voice data upon attaining the full voice frame or the maximum delay in voice transmission.

In another aspect, embodiments of the present invention are directed to one or more computer-readable media having computer-executable instructions embodied thereon that, when executed, perform a method for facilitating voice and data transmission over a single communication path during an aggregate communication event. The method includes monitoring voice traffic and identifying that an extent of the voice traffic exists to accommodate a full voice frame or that transmission of the voice traffic has been delayed by a particular amount of time. The method also includes transmitting a voice frame having the voice traffic, wherein the full voice frame is transmitted when the extent of the voice traffic exists to accommodate a full voice frame and a partial voice frame is transmitted when the transmission of the voice traffic has been delayed by the particular amount of time.

In yet another aspect, a method for facilitating voice and data transmission over a single communication path during an aggregate communication event. The method includes delaying transmission of voice data until a full voice frame or a delay threshold is attained. The delay threshold indicates a maximum amount of delay for transmitting voice data. Network data is transmitted during the transmission delay of the voice data. The network data is transmitted by way of a first access network using a predetermined band class. Upon attaining the full voice frame or the delay threshold, the voice data is transmitted by way of a second access network using the predetermined band class.

Figure 2:
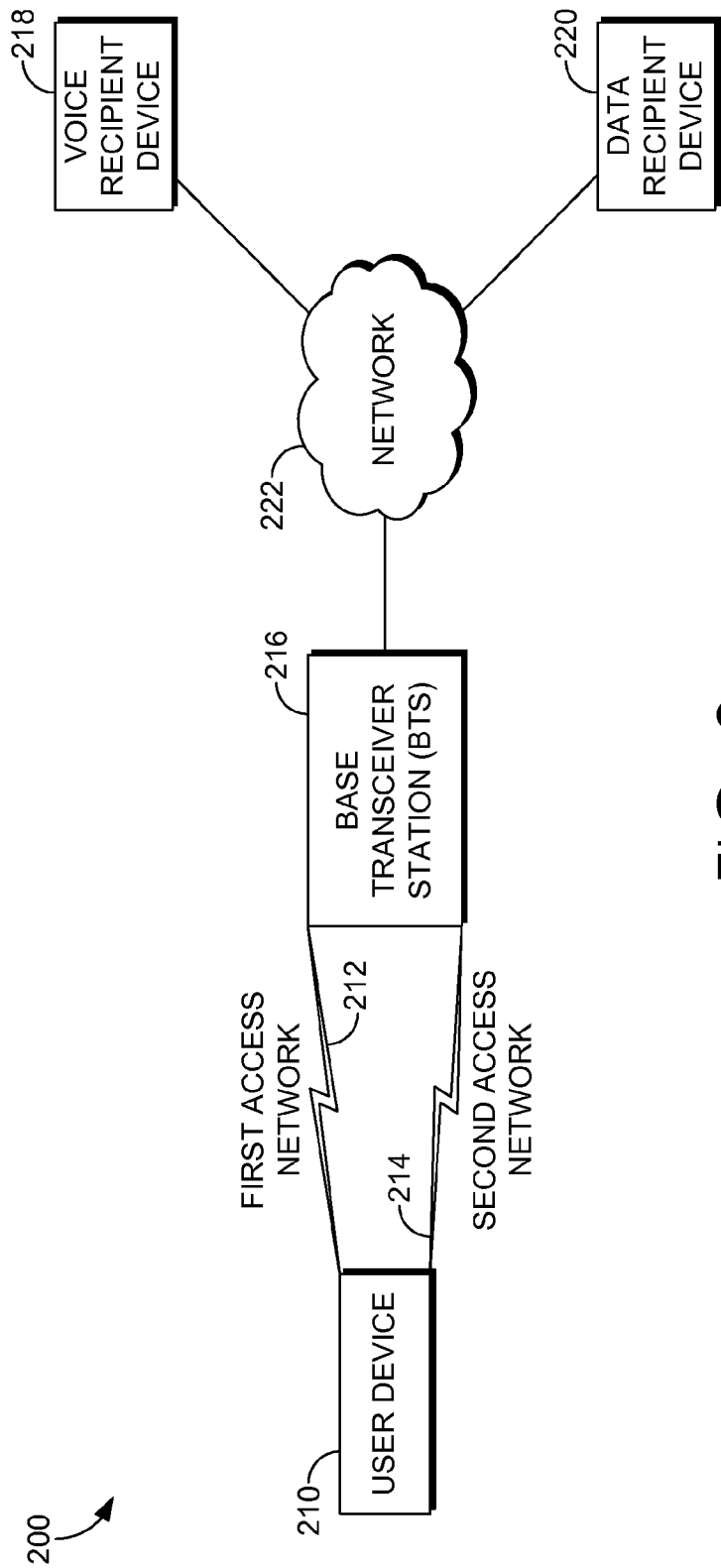
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 210 may communicate with a voice recipient device(s) 218 and/or a data recipient device(s) 220. The voice recipient device 218 is in voice communication with the user device 210, and the data recipient device 220 provides data services to the user device 210. The user device 210, the voice recipient device 218, and/or the data recipient device 220 may take on a variety of forms, such as a personal computer (PC), a laptop computer, a tablet, a mobile phone, a personal digital assistant (PDA), a server, or any other device that is cable of communicating with other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device and/or a voice recipient device comprise a wireless or mobile device with which a wireless telecommunications network is utilized for communication (e.g., voice communication). In this regard, the user device communicates with other devices using a wireless telecommunications network(s). In some cases, data recipient device 220 may be a server, for example, that hosts information accessed by the user device 210 (e.g., a website host) via the Internet.

The user device 210, the voice recipient device 218, and/or the data recipient device 220 are capable of communicating via a communications network 222. Network 222 might be a single network or multiple networks, as well as being a network of networks. A network(s) might comprises, for example, a cable network, the Internet, a wireless network (e.g., a wireless telecommunications network), or a combination thereof or portions thereof. In embodiments, network 222 is or includes a wireless network (e.g., a wireless telecommunications network). A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), LTE, Universal Mobile Telecommunications Systems (UMTS), Integrated Digital Enhanced Network (iDEN), WiMAX, 3G, 4G, and Personal Communications Service (PCS). A wireless telecommunications network might include an array of devices. Components such as a base station, a communications tower, or even access points (as well as other components) can provide wireless connectivity in some embodiments.

The user device 210 may utilize a first access network 212 and a second access network 214 to communicate by way of base transceiver station 216. Access networks 212 and/or 214 may be any type of radio access network, such as cable, wireless, e.g., 3G or 4G, and the like. In one embodiment, first access network 212 is CDMA while second access network 214 is LTE. Accordingly, the user device 210 can communicate using both CDMA and LTE. In this regard, the user device 210 may perform voice communications via CDMA and data communications via LTE during an aggregate communication event. Such a user device 210 may be referred to as a simultaneous voice and LTE device (SV-LTE).

The base transceiver station 216 transmits and receives radio signals. In embodiments, the base transceiver station 216 includes a transceiver(s), an antenna(s), and equipment for encrypting and decrypting communications with a base station controller (BSC) (not shown). The base transceiver station 216 can include any number of antennas (not shown). In one embodiment, the base transceiver station 216 includes an antenna(s) capable of supporting both first access network 212 (e.g., CDMA) and second access network 214 (e.g., LTE). As can be appreciated, antennas associated with the base transceiver station 216 can be internal or external to the base transceiver station.

Although not illustrated, the first access network 212 and second access network 214 utilize a single communication path to transmit voice and data communications during an aggregate communication event. A communication path, as used herein, refers to a specific band class or frequency band used for voice and/or data transmission. A band class refers to a set of frequency channels and a number scheme for the channels. By way of example, and not limitation, a communication path may be band class 1, band class 10, band class 14, etc.

In implementation, the user device 210 establishes a voice call with voice recipient device 218. Such a voice call can be initiated by a user of the user device 210 or a recipient of the voice recipient device 218. The user device 210 utilizes first access network 212 (e.g., CDMA) to access the base transceiver station 216. During the voice call, voice frames (e.g., CDMA frames) having voice data are transmitted to the base transceiver station 216 using a communication path.

To enable network data to be transmitted via the second access network 214 (e.g., LTE) during the voice call using the same communication path (e.g., band class 1), the transmission of the voice data can be delayed to allow network data transmission via the communication path during the voice transmission delay. In this regard, transmission of voice data is delayed until a full voice frame can be transmitted and/or until a threshold delay occurs or is exceeded. Accordingly, as voice data accumulates, network data (e.g., via data frames) can be transmitted by way of the second access network 214 over the same communication path used for transmission of voice frames. A voice frame refers to a frame having voice data, and a data frame refers to a frame having network data.

As discussed, transmission of voice data can be delayed until a full voice frame can be transmitted. A full voice frame refers to a voice frame having a predetermined bit rate (e.g., a maximum bit rate or full rate) associated with voice data. In this regard, voice data can be concatenated (i.e., aggregated or joined together) until enough bits for a full voice frame are accumulated (e.g., 9600 bits). By way of example, and not limitation, CDMA frames can be transmitted at one-eighth rates (1200 bits), one-quarter rates (2400 bits), one-half rates (4800 bits), and at full rates (9600 bits). In embodiments, voice data associated with a maximum of 8⅛ rate frames may be concatenated into one full voice frame, for example, resulting in a delay of 160 milliseconds. Voice data that would result in rates lower than a full rate (i.e. non-full frame or partial frame) are delayed and concatenated such that a full frame can be established and transmitted. Accordingly, a delay of a concatenated voice transmission is determined by combining the conventional variable rate frame bits until enough bits for a full voice frame are accumulated. In this regard, a voice frame can be transmitted upon aggregating voice data to attain a full voice frame or at least a voice frame that has a greater bit rate than it would have initially had prior to aggregating voice data.

Additionally or alternatively, transmission of voice data can be delayed until a delay threshold occurs or is exceeded. To minimize a voice delay that might be detected by a user, a delay threshold may be utilized. A delay threshold refers to a maximum delay that is deemed acceptable for delaying transmission of voice data (e.g., a delay that is substantially undetected by a user). A delay threshold can be a predetermined time delay, such as 80 milliseconds, and/or a predetermined number of delayed voice frames, such as four voice frames, that is used to trigger transmission of a voice frame(s). In this regard, voice data can be concatenated until a maximum delay results.

As previously mentioned, in embodiments, a maximum of $8⅛^{th}$ rate frames can be concatenated into one full voice frame thereby creating a delay of 160 milliseconds. Such a delay may be detected by a user and, as such, a delay threshold can be employed to minimize an opportunity for a user to recognize a voice delay. In some embodiments, a delay threshold is indicated by a time or a time period, such as an 80 millisecond delay. In other embodiments, a delay threshold is indicated by a number of voice frames. For instance, in some implementations, the increments for voice transmission delay occur in multiples of the voice frame, or 20 milliseconds. Accordingly, if a maximum delay of 80 milliseconds is desired, for example, voice data is combined until voice data associated with four voice frames is combined. In cases that a transmission delay occurs, voice data that is combined before 9600 bits are accumulated is transmitted as a partial frame.

By way of example only, FIGS. 3A-3C illustrate voice data and network data during an aggregate communication event. In particular, FIGS. 3A-3B illustrate delay, concatenation, and transmission of voice data, while FIG. 3C illustrates transmission of network data. With initial reference to FIG. 3A, conventional voice frames 302 that correspond with a voice call are illustrated. For instance, voice frame 1 illustrates a ⅛ rate (e.g., user is not likely talking), voice frame 2 illustrates a ¼ rate, voice frame 3 illustrates a ½ rate, voice frame 4 illustrates another ⅛ rate, voice frame 5 illustrates a full rate, etc. Such rates represent voice activity of the user. In accordance with embodiments of the present invention, transmission of voice data associated with a lower rate can be delayed and concatenated to attain a full voice frame or an aggregated partial frame. Accordingly, transmission of voice data associated with voice frame 1, voice frame 2, voice frame 3, and voice frame 4 can be delayed and such voice data can be concatenated and transmitted upon attaining a full voice frame.

As illustrated in FIG. 3B, the first full voice frame 310 includes concatenated voice data associated with voice frame 1, voice frame 2, voice frame 3, and voice frame 4 of FIG. 3A to attain a full voice frame. The first full voice frame 310 is transmitted as a full voice frame upon an 80 millisecond delay, as illustrated by reference numeral 312. The second full voice frame 314 includes voice data associated with voice frame 5 of FIG. 3A. Because voice frame 5 of FIG. 3A includes voice data fulfilling a full rate, the second full voice frame 314 is transmitted upon a 20 millisecond delay, as illustrated by reference numeral 316.

In accordance with the delay of transmission of the first full voice frame 310, data frames (e.g., LTE frames) can be transmitted during the delay of the voice frame transmission such that both voice frames and data frames can be transmitted via the same band class. With reference to FIG. 3C, an access network (e.g., LTE) different than the access network used for voice data (e.g., CDMA) can be used to transmit network data during delay of transmission of voice data. For example, blocks 320, 322, 324, 326, and 328 illustrate instances that network data can be transmitted based on the delay in voice data transmission. In some cases, such network data can be transmitted from the user device, such as user device 210 of FIG. 2, to the data recipient device, such as data recipient device 220 of FIG. 2. In other cases, network data can be transmitted from the data recipient device, such as data recipient device 220 of FIG. 2, to the user device, such as user device 210 of FIG. 2, while transmission of voice data is delayed.

Control bits can be used to manage simultaneously providing voice and data to a user during an aggregate communication event. Control bits can be used to, among other things, inform the BTS of a transmission delay, inform the BTS of a combination and/or order of concatenated voice data in a currently transmitted frame, and/or to indicate occupancy of a subsequent frame.

By way of example only, and not limitation, a system, such as the CDMA system, can use control bits at a particular rate, such as a rate of 800 bits per second. In cases of concurrent voice and data access networks being used over a single communication path (e.g., transmission channel) during an aggregate communication event, for example, a portion of the total bits (e.g., 400 bits) might be dedicated to manage such operation. As can be appreciated, 400 bits per second equals eight bits per 20 millisecond frame.

As previously mentioned, control bits can be used to inform the BTS of a transmission delay. Providing an indication of a transmission delay enables a BTS to know the amount of delay such that the conventional speech can be recreated. In order for the BTS to recognize the transmission delay without having to decode each original frame, control bits can be used indicate the delay per voice frame. In one embodiment, two bits can be used to indicate the delay. For instance, 00 equals a 20 millisecond delay, 01 equals a 40 millisecond delay, 10 equals a 60 millisecond delay, and 11 equals an 80 millisecond delay.

Control bits can also be utilized to provide an indication of a combination and/or order of concatenated voice data in a currently transmitted voice frame. For example, five bits can be used to inform the BTS of a combination and/or order of concatenated voice data in the currently transmitted frame. A control bit(s) can also be used to indicate an extent of vacancy of subsequent frame. Accordingly, one bit can be reserved and transmitted at the end of a voice frame as a vacancy indicator for the next frame. That is, one control bit can be used to identify whether a subsequent frame will be used for voice data so that the BTS can appropriate prepare (e.g., prepare for LTE when not subsequently transmitting voice). By way of example only, if the next voice frame is vacant (less the last control bit), the control bit for the present voice frame might be a 1. On the other hand, if the next voice frame is busy or occupied, the control bit for the present voice frame might be a 0 to provide such an indication.

Figure 4:
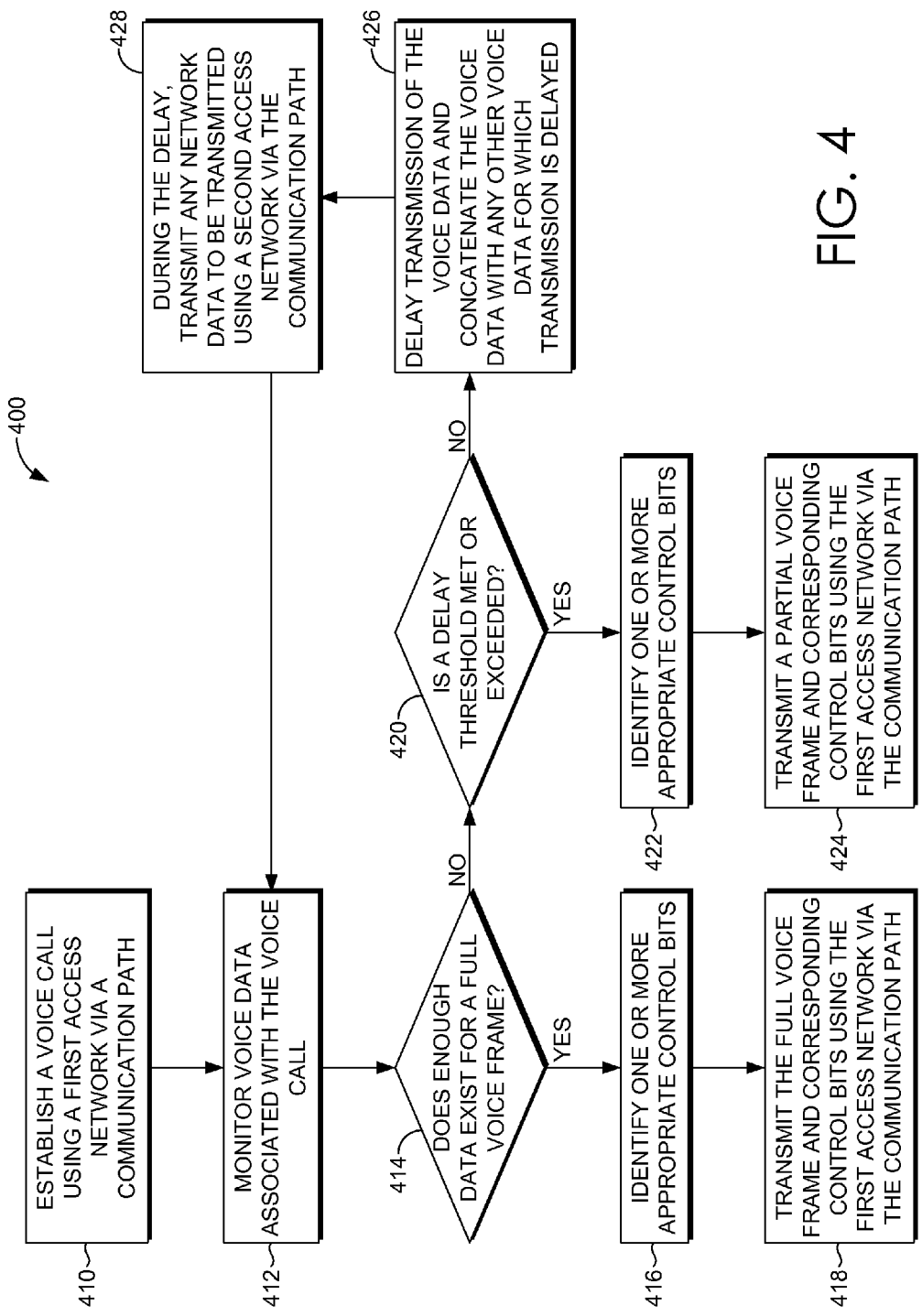
FIG. 4 provides an exemplary first method for facilitating providing voice and data using a single communication path during an aggregate communication event, in accordance with an embodiment of the present invention.

With reference to FIG. 4, a flow diagram is shown illustrating a method 400 for facilitating providing voice and data using a single communication path during an aggregate communication event, in accordance with an embodiment of the present invention. In embodiments, method 400 can be performed at a user device, such as user device 210 of FIG. 2. Initially, as indicated at block 410, a voice call is established with a voice recipient device using a first access network via a communication path (e.g., band class 1). Accordingly, a user of a user device and a user of a voice recipient device can have a phone conversation, for example, by way of CDMA using a particular communication path. In embodiments, such a user device is a user device that utilizes a first access network (e.g., CDMA) for voice communication and utilizes a second access network (e.g., LTE) for data communication. In this regard, the user device is being utilized for both voice communication (e.g., a phone call) and data communication (e.g., website access). At block 412, voice data associated with the voice call is monitored. For instance, voice data associated with a user of a user device can be detected, and analyzed. At block 414, it is determined if a sufficient amount of voice data exists for a full voice frame (e.g., full rate frame). If voice data exists for a full voice frame, appropriate control bits are identified, as indicated at block 416. For example, two control bits can indicate a transmission delay, five control bits can indicate a combination of concatenated voice data, if necessary, and one control bit can indicate an extent of vacancy of a subsequent voice frame. Subsequently, the full voice frame and corresponding control bits are transmitted using the first access network via the communication path. This is indicated at block 418.

Returning to block 414, if it is determined that enough voice data does not exist for a full voice frame, it is determined if a delay threshold is met or exceeded, as indicated at block 420. Such a delay threshold might be, for instance, a maximum amount of time or a maximum number of frames during which transmission of voice data is delayed. If it is determined that a delay threshold is met or exceeded, appropriate control bits are identified, as indicated at block 422. By way of example only, two control bits can indicate a transmission delay, five control bits can indicate a combination of concatenated voice data, if necessary, and one control bit can indicate an extent of vacancy of a subsequent voice frame. At block 424, a partial voice frame is transmitted using the first access network via the communication path. Such a partial voice frame includes voice data accumulated during any transmission delay of voice data.

If, however, it is determined that a delay threshold is not met or exceeded at block 420, transmission of voice data is delayed and the voice data is concatenated with any other voice data for which transmission is delayed. This is indicated at block 426. In embodiments, voice data can be buffered at the user device until enough voice data accumulates for a full voice frame or until a delay threshold is met or exceeded such that the voice data is transmitted. At block 428, any network data to be transmitted (e.g., to or from the user device) is transmitted using a second access network via the communication path. In embodiments, the network data is transmitted using LTE over the communication path while transmission of voice data is delayed.

Referring now to FIG. 5, a flow diagram is shown illustrating a method 500 for facilitating providing voice and data using a single communication path during an aggregate communication event, in accordance with an embodiment of the present invention. In embodiments, method 500 can be performed at a user device, such as user device 210 of FIG. 2. Initially, as indicated at block 510, transmission of voice data is delayed until a full voice frame is attained or a delayed threshold is attained. At block 512, the voice data being delayed is aggregated or concatenated. At block 514, network data is transmitted during the transmission delay of the voice data via a first access network using a predetermined band class. Upon attaining the full voice frame or the delay threshold, the voice data is transmitted via a second access network using the predetermined band class, as indicated at block 516.

With reference to FIG. 6, a flow diagram is shown illustrating a method 600 for facilitating providing voice and data using a single communication path during an aggregate communication event, in accordance with embodiments of the present invention. In embodiments, method 600 can be performed at a BTS, such as BTS 216 of FIG. 2. Initially, as indicated at block 610, it is recognized that a mobile device uses a first and a second access network. Stated differently, it is identified that the mobile device that concurrently provides voice and data during an aggregate communication event. At block 612, a voice call associated with the mobile device is established. A voice frame having a control bit is received, as indicated at block 614. Such a voice frame includes a control bit indicating whether a subsequent frame will include voice data or network data. Subsequently, at block 616, voice data or network data is prepared to be received in accordance with the control bit. In one implementation, the BTS continues to receive voice frames and appropriately prepare for data reception, as indicated at blocks 614 and 616, until the voice call terminates. In other implementations, the BTS continues to receive voice frames and appropriately prepare for data reception while the mobile device is associated with the BTS.

It will be understood by those of ordinary skill in the art that the order of steps shown in the method 400 of FIG. 4, method 500 of FIG. 5, and method 600 of FIG. 6 are not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for facilitating voice and data transmission over a single communication path during an aggregate communication event, the method comprising:

aggregating voice data until a full voice frame can be transmitted or a maximum delay of voice transmission exists; and transmitting, via a first access network, a voice frame comprising the aggregated voice data upon attaining the full voice frame or the maximum delay in voice transmission, wherein transmission of the voice data is delayed until the full voice frame can be transmitted or a maximum delay of voice transmission exists and wherein network data is transmitted, via a second access network, while the transmission of the voice data is delayed, the first access network being different from the second access network.

2. The media of claim 1, wherein the voice frame further comprises a set of control bits that indicate at least one of an amount of delay, a combination of aggregated voice data, and an extent of vacancy of a subsequent voice frame.

3. One or more non-transitory computer-readable storage media having computer-executable instructions embodied thereon that, when executed, perform a method for facilitating voice and data transmission over a single communication path during an aggregate communication event, the method comprising:

monitoring voice traffic;

identifying that an extent of the voice traffic exists to accommodate a full voice frame or that a transmission of the voice traffic has been delayed by a particular amount of time; and transmitting, via a first access network, a voice frame having the voice traffic, wherein the full voice frame is transmitted when the extent of the voice traffic exists to accommodate full voice frame and a partial voice frame is transmitted when the transmission of the voice traffic has been delayed by the particular amount of time, wherein transmission of the voice traffic is delayed until it is identified that the extent of the voice traffic exists to accommodate the full voice frame or that the transmission of the voice traffic has been delayed by the particular amount of time, and wherein data traffic is transmitted, via a second access network, while the transmission of the voice data is delayed, the first access network being different from the second access network.

4. The media of claim 3, wherein the voice traffic results from voice input by a user of a user device.

5. The media of claim 3, wherein the voice traffic is transmitted via the first access network over a frequency band and the data traffic is transmitted via the second access network over the same frequency band.

6. The media of claim 3, wherein the method further comprises buffering and concatenating the voice traffic until it is identified that the extent of the voice traffic exists to accommodate the full voice frame or that the transmission of the voice traffic has been delayed by the particular amount of time.

7. The media of claim 3, wherein the particular amount of time for which transmission of the voice traffic has been delayed is based on a time duration deemed unlikely to be detected by a user.

8. A method for facilitating voice and data transmission over a single communication path during an aggregate communication event, the method comprising:

delaying transmission of voice data until a full voice frame or a delay threshold is attained, the delay threshold indicating a maximum amount of delay for transmitting voice data;

transmitting network data during the transmission delay of the voice data, the network data being transmitted by way of a first access network using a predetermined band class; and upon attaining the full voice frame or the delay threshold, transmitting the voice data by way of a second access network using the predetermined band class, wherein the transmission of the network data is delayed during the transmission of the voice data.

9. The method of claim 8, wherein the network data comprises non-voice data transmitted in association with the Internet.

10. The method of claim 8, wherein the voice data comprises data associated with voice input by a user via a mobile device.

11. The method of claim 8 further comprising identifying one or more control bits that indicate at least one of an amount of delay, an order of the voice data, and an extent of vacancy of a subsequent frame.

12. The method of claim 8 further comprising concatenating the voice data until a full voice frame or a delay threshold is attained, the delay threshold indicating a maximum amount of delay for transmitting voice data.

13. The method of claim 12 further comprising buffering the voice data.

14. The method of claim 8, wherein the first access network comprises a Long Term Evolution (LTE) network and the second access network comprises a Code Division Multiple Access (CDMA) network.

\* \* \* \* \*